United States Patent [19]
Derner

[11] 3,873,103
[45] Mar. 25, 1975

[54] SEAL CARRIER ASSEMBLY
[75] Inventor: William J. Derner, Indianapolis, Ind.
[73] Assignee: FMC Corporation, San Jose, Calif.
[22] Filed: June 20, 1973
[21] Appl. No.: 371,922

[52] U.S. Cl.................. 277/66, 277/136, 277/178, 308/36.1
[51] Int. Cl. ............................ F16j 9/00, F16c 1/24
[58] Field of Search..................... 277/66, 178, 136; 308/36.1, 187.1

[56] References Cited
UNITED STATES PATENTS

| | | | |
|---|---|---|---|
| 2,734,758 | 2/1956 | Shanke | 308/187.1 |
| 2,983,529 | 5/1961 | Price | 277/178 X |
| 3,285,614 | 11/1966 | McClenathan | 277/136 X |
| 3,664,674 | 5/1972 | Yehl | 277/66 |

Primary Examiner—Samuel B. Rothberg
Attorney, Agent, or Firm—J. F. Verhoeven; C. E. Tripp

[57] ABSTRACT

A seal carrier is mounted in a split housing and is locked therein against axial, radial and rotational displacement. The carrier has a peripheral groove which receives a circular rib surrounding an opening in the housing in which the carrier is received. The rib has sloping sidewalls which are wedged into sloping sidewalls of the carrier groove when the split housing is bolted together to lock the carrier against axial or radial motion with respect to the housing. An O-ring is mounted in the groove under the rib to seal the connection between the carrier and the housing. A lug on the carrier, which is received in a recess in the housing, prevents rotation of the carrier with respect to the housing.

3 Claims, 4 Drawing Figures

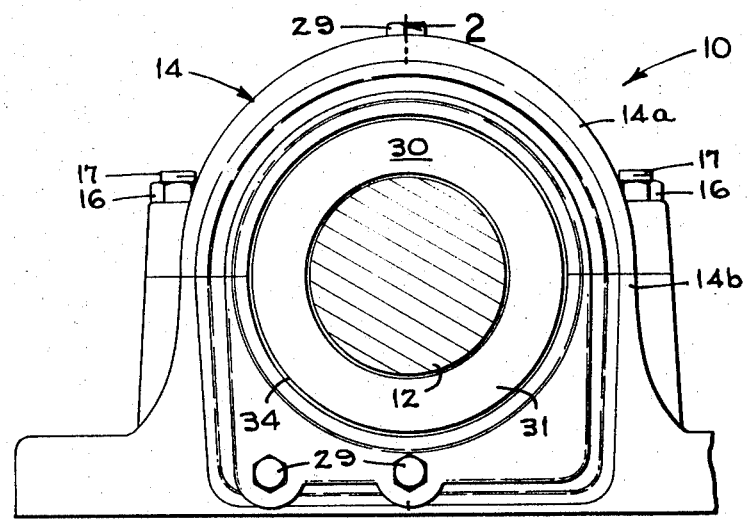
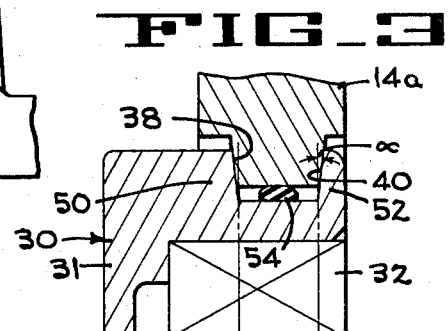
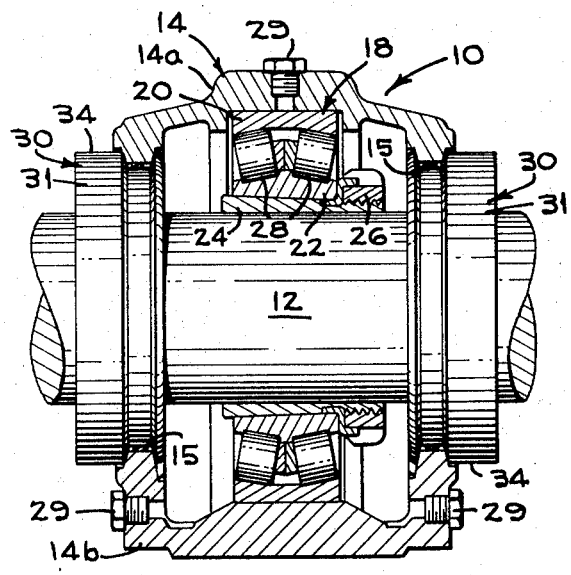
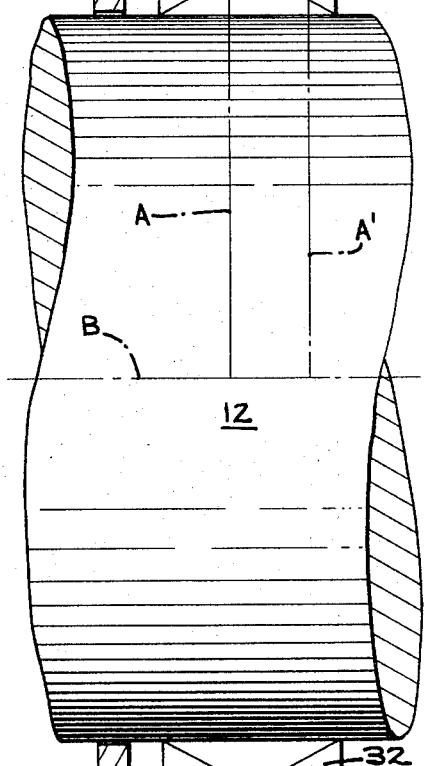
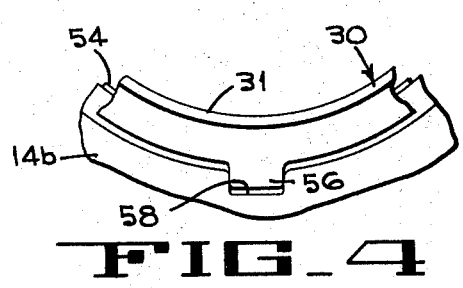

3,873,103

SEAL CARRIER ASSEMBLY

BACKGROUND OF THE INVENTION

The present invention relates to a shaft seal mounting construction and, more particularly, to the mounting of a shaft seal in a housing.

In many applications where a shaft is supported by a bearing, as in a pillow block, it is important that the bearing be protected from the dirt and grit of the environment in which the shaft is operating. Frequently, the bearing is mounted in a pillow block housing through which the shaft passes, and a shaft seal carrier is mounted at each end of the housing. The seal carrier, in which an annular seal is mounted surrounds the shaft and blocks dirt and grit from entering the housing. In a dirty, or abrasive, environment, it is vitally important that the seals effectively keep all foreign substances out of the pillow block housing.

One factor which contributes to the ineffectiveness of the seals in blocking dirt from the interior of the bearing housing is displacement of the seal carrier with respect to the shaft. If the seal should become cocked out of a plane normal to the shaft, or should shift radially in that normal plane, one side of the seal may separate from the shaft to permit the entry of dirt or grit. Often, the seal carrier will be cocked or shifted as a result of rough handling during the installation of the pillow block bearing. Other times, the vibration of a rotating shaft, which may not be completely true, will shake the seal carrier into a cocked or shifted position. Sometimes an accidental blow to the pillow block housing after installation will loosen the seal carrier and permit a displacement of the seal with respect to the shaft.

The importance of maintaining the seal in proper radial relationship to the shaft, and in a plane normal to the shaft, has been recognized heretofore. For example, the seal has been mounted in a carrier which has an external groove with sloping walls. A rib on the housing in which the seal has been mounted has been provided with complementary sloping walls for a wedge mounting of the seal carrier in the housing. This wedge mounting is designed to minimize radial displacement of the seal carrier, and hence the seal, with respect to the shaft and maintain the seal carrier and seal normal to the shaft.

SUMMARY OF THE INVENTION

However, it is not only radial displacement of the seal carrier, or cocking thereof out of a plane normal to the shaft, which can destroy the effectiveness of the seal in shielding the bearing from dirt and grit.

If the seal carrier becomes loose in the bearing housing, or if unusual torque is applied to the seal carrier by the shaft, the seal carrier may begin rotation in the housing which will damage the seal.

In accordance with the present invention, the seal carrier is locked against rotation in the bearing housing. In the preferred form of the invention, intermeshing portions of the bearing housing and the seal carrier have sloping walls which provide a wedging grip by the housing on the carrier when the housing, which has separable portions, is bolted together around the shaft, as has previously been accomplished. Preferably, however, an O-ring is installed between the intermeshing portions of the housing and carrier to tightly seal the wedge connection therebetween and to minimize any tendency of the seal carrier to rotate in the bearing housing. More importantly, in accordance with the present invention, a lug on the seal carrier fits in a recess in the housing to lock the carrier against rotation in the housing.

It is therefore one object of the present invention to provide a mounting construction for a seal carrier in a housing which prevents rotational displacement of the carrier in the housing.

It is another object of the present invention to clamp and seal a shaft seal carrier in a housing, and to lock the carrier against rotation, to prevent the seal from admitting grit or dirt into a bearing.

BRIEF DESCRIPTION OF THE DRAWINGS

FIG. 1 is a front view in elevation of a pillow block bearing assembly with a shaft extending therethrough and having seal carriers mounted therein in accordance with the present invention.

FIG. 2 is a view taken on the line 2—2 of FIG. 1.

FIG. 3 is an enlarged view of the seal carrier as mounted in the pillow block, taken as the view of FIG. 2.

FIG. 4 is a view taken on the line 4—4 of FIG. 3 showing the locking lug on the carrier to prevent rotation of the carrier in the housing.

DESCRIPTION OF THE PREFERRED EMBODIMENT

There is shown in FIG. 1 a pillow block unit 10 supporting a shaft 12. The pillow block unit has a housing 14 comprising two separable portions 14a, 14b which are secured together by nuts 16 and studs 17 when the pillow block unit is in assembled relation with the shaft. The housing 14, when in assembled relation, has an opening 15 at each end through which the shaft 12 extends.

As shown best in FIG. 2, the pillow block unit has a double row roller bearing 18 mounted therein. The outer race 20 of the bearing is pressed tightly into the housing 14, and the inner race 22 is mounted on a wedge sleeve 24 which is tightly received on the shaft. The inner race 22, which has a sloping inner surface complementary to the outer surface of the wedge sleeve, is locked on the wedge sleeve by nut 26. Two rows of rollers 28 are received between the races. The housing 14 has plugs 29 which close passages provided for the entry or discharge of lubricants into the housing.

Two seal units 30 are mounted in the pillow block housing 14, one on each side of the bearing 18. The seal units are provided to keep dirt and dust in the environment from entering the pillow block housing and damaging the bearing therein. It is therefore important that each seal unit effectively close the opening 15 around shaft 12.

Each seal unit 30 comprises a rigid seal ring, or carrier, 31 and a flexible, resilient seal 32. The seal carrier is circular in conformation and has a circular outer surface 34. A peripheral groove 36 is cut in the outer surface 34. The groove 36 has sidewall surfaces 38, 40 which are sloping, or tapered, at a small angle $\alpha$ to the planes A and A'. The planes A, A' are perpendicular to the central axis B of the shaft 12. At each opening 15 of the pillow block housing there is a circular rib portion 44 extending into the opening. The rib portion 44 has wall surfaces 46, 48 which slope, or taper, at the same angle α to the planes A and A' as the walls of groove 36.

When the two portions of the separable pillow block unit housing 14 are joined together around the seal units and the shaft, the rib portion 44 of the housing is received in the groove 36 of the seal unit. Thus, the housing rib portion 44, and two seal unit portions 50, 52 on either side of the groove 36, constitute intermeshing portions of the housing and the seal unit. The wedging surfaces 38, 40 and 46, 48 of the seal unit and housing enable the housing to clamp the seal casing rigidly in the housing to maintain the seal in a proper, aligned and centric position relative to the shaft without radial or axial displacement.

This type of intermeshing, wedge relationship between the housing and the seal carrier has been used heretofore. To more effectively prevent displacement of the seal carrier in the housing, and to better seal the wedge connection between the seal carrier and the housing, an O-ring 54 is interposed between the rib and the groove. The compression of the O-ring when the housing portions are bolted together over the seal carrier, preloads the carrier in the housing to constitute a tighter fit therein and to resist any tendency of the seal carrier to rotate in the housing.

With the wedge connection between the housing and the seal unit, the seal casing cannot shaft radially or axially with respect to the shaft, nor can the seal casing cock or tilt out of a plane perpendicular to the axis B of the shaft. The O-ring, when the two pillow block housing portions are bolted together, is compressed until the tapered sidewalls of the ridge portion 44 engage the tapered sidewalls of the groove so that the seal unit is positively located and clamped with respect to the pillow block housing.

In order to effectively lock the seal carrier against all relative motion with the housing 14, the seal unit casing has a lug 56 which is received in a recess 58 in the housing 14 when the units are secured in assembled relation. The lug and walls of the recess, which define intermeshing portions of the carrier and the housing, prevent any rotation of the seal unit with respect to the housing. Thus, the seal unit is locked against, not only radial or axial displacement with respect to the housing, but also against rotational displacement with respect thereto.

Thus, a mounting construction has been provided in which all possible degrees of freedom of motion of the seal carrier with respect to the housing has been effectively prevented to maintain the seal in effective sealing relationship to the shaft.

Although the best mode contemplated for carrying out the present invention has been herein shown and described, it will be apparent that modification and variation may be made without departing from what is regarded to be the subject matter of the invention.

What is claimed is:

1. In a seal assembly for surrounding a shaft, said assembly comprising a housing having separable portions, said housing defining an opening therein for said shaft when said portions are secured together, a rigid seal carrier received in said opening, said seal carrier supporting a flexible seal encircling said shaft, circumferential intermeshing portions extending from said housing opening and from said seal carrier, said circumferential intermeshing portions having sloping sides to provide a wedging grip by said housing on said seal carrier when said separable housing portions are clamped together over said seal carrier to thereby positively lock the carrier against radial and axial displacement with respect to the housing, the improvement comprising seqmental intermeshing portions on said seal carrier and said housing to prevent rotation of said seal carrier in said housing.

2. In a seal assembly for surrounding a shaft, said assembly comprising a housing having separable portions, said housing defining an opening therein for said shaft when said portions are secured together, a rigid seal carrier received in said opening, said seal carrier supporting a flexible seal encircling said shaft, intermeshing portions consisting of a cirumferential rib and a circumferential groove in said housing opening and said seal carrier, said intermmeshing portions having sloping sides to provide a wedging grip by said housing on said carrier when said separable housing portions are clamped together over said seal carrier to thereby provide a positive lock against radial and axial displacement of the carrier with respect to the housing, the improvement comprising an O-ring received in said groove for compression by said rib when the separable housing portions are secured together to seal the joint between said seal carrier and said housing, and segmental intermeshing portions on said seal carrier and said housing to provide a positive lock against rotation of said seal carrier in said housing.

3. In a seal assembly for surrounding a shaft, comprising a housing having separable portions, said housing defining an opening therein for said shaft when said portions are secured together, a rigid seal carrier received in said opening, said seal carrier supporting a flexible seal engaging said shaft, intermeshing portions consisting of a circumferential rib and a circumferential groove in said housing opening and said seal carrier, said intermeshing portions having sloping sides to provide a wedging grip by said housing on said carrier when said separable housing portions are clamped together over said seal carrier to thereby provide a positive lock against radial and axial displacement of the carrier with respect to the housing, the improvement comprising an O-ring received in said groove for compression by said rib when the separable housing portions are secured together to seal the joint between said seal carrier and said housing, and intermeshing portions, consisting of a lug and a recess, on said seal carrier and said housing to provide a positive lock against rotation of said seal carrier in said housing.

* * * * *